F. F. STAUFFER.
MECHANISM FOR GRADUALLY CHANGING ROTATIVE VELOCITY.
APPLICATION FILED MAY 31, 1910.
1,000,633.
Patented Aug. 15, 1911.
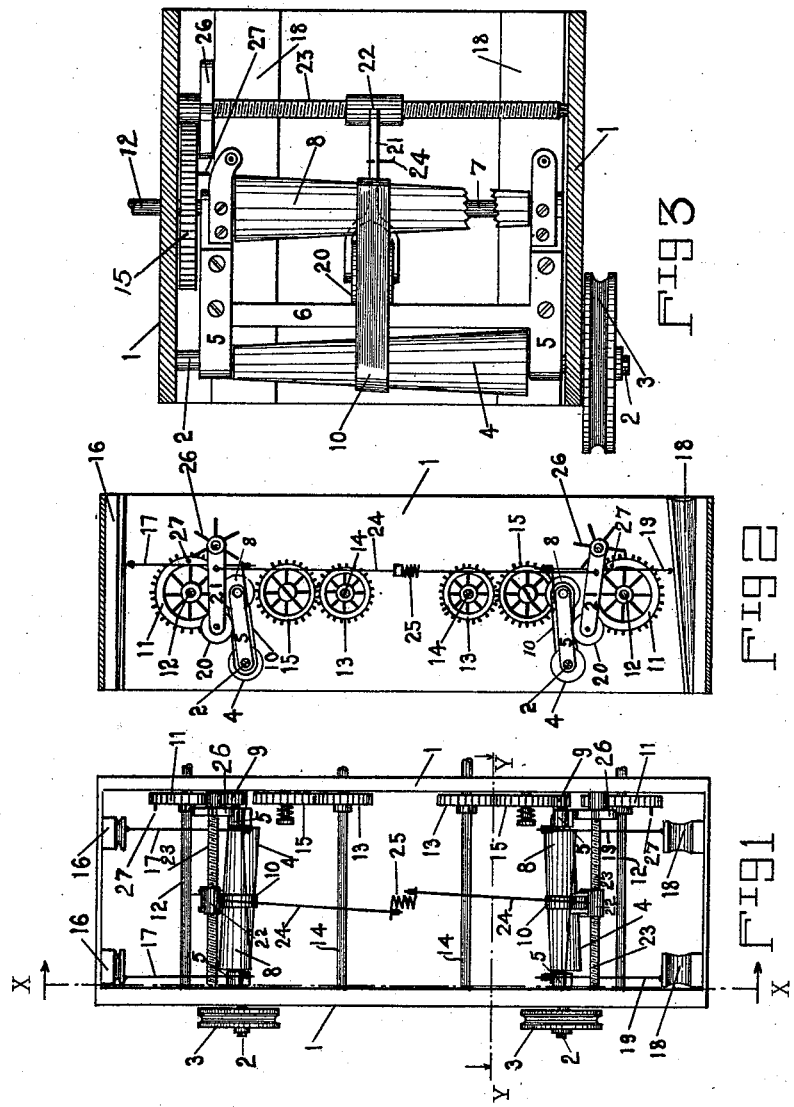
WITNESSES:
W. M. Parham
J. S. Murray
INVENTOR
Floyd F. Stauffer
BY John M. Spellman
ATTORNEY

UNITED STATES PATENT OFFICE.

FLOYD F. STAUFFER, OF DALLAS, TEXAS, ASSIGNOR OF ONE-HALF TO WILLIAM J. GLYNN, OF DALLAS, TEXAS.

MECHANISM FOR GRADUALLY CHANGING ROTATIVE VELOCITY.

1,000,633.  Specification of Letters Patent.  Patented Aug. 15, 1911.

Original application filed May 31, 1910, Serial No. 564,153. Divided and this application filed May 31, 1910. Serial No. 564,154.

*To all whom it may concern:*

Be it known that I, FLOYD F. STAUFFER, citizen of the United States, residing at Dallas, in the county of Dallas and State of Texas, have invented certain new and useful Improvements in Mechanisms for Gradually Changing Rotative Velocity, of which the following is a specification.

My invention relates to new and useful improvements in mechanism for gradually changing rotative velocity and relates more particularly to a mechanism adapted to vary the speed of rotation of the reels upon which the controller sheet of an automatic piano is mounted in order to counteract the tendency of the controller sheet to increase its speed as it winds from one reel upon another, this application being a division of application serial number 564,153 filed of even date herewith.

The object of the invention is to provide a power transmitting mechanism consisting of a pair of cone pulleys across which a belt is adapted to gradually feed, the velocity ratio between the two pulleys varying as the belt is transversely displaced.

A further object is to provide means for transmitting motion from the driven member of said pair of pulleys to either of two shafts, which transmission means may be disconnected from both of said shafts when desired.

A still further object is to provide a special modified form of power-transmitting device in which the cone pulley mechanism will be doubled, adapting the device to drive two pair of shafts at a constantly varying speed.

Finally, the object of the invention is to provide a mechanism of the character above described which will be simple, and efficient and comparatively easy to construct, and one in which the various parts will not be likely to get out of working order.

With these and various other objects in view, my invention has relation to certain novel features of construction and operation, an example of which is described in the following specification and illustrated in the accompanying drawing, wherein:

Figure 1 is a front view of the herein described mechanism. Fig. 2 is a transverse vertical sectional view taken on the line $x$—$x$ of Fig. 1. Fig. 3 is a horizontal sectional view taken on the line $y$—$y$ of Fig. 1.

Referring now more particularly to the drawing wherein like numerals of reference designate similar parts in all the figures, the numeral 1 denotes the sides of a frame work within which the mechanism is mounted. In the upper and lower portions of this frame work, shafts 2 carrying driving pulleys 3 are mounted in vertical alinement. Each of the shafts 2 carries a cone pulley 4 rigid thereupon. Also, from each shaft there is pivoted a frame consisting of transverse arms 5 and a cross piece 6. In the extremities of each pair of arms 5 is mounted a shaft 7 which carries a cone pulley 8 and a spur pinion 9, the former being mounted with its base opposite to the narrow portion of the pulley 4. A belt 10 is mounted upon each pair of pulleys 4 and 8. Each of the pinions 9 is adapted to communicate rotation either directly to a gear 11 mounted upon a shaft 12 or indirectly to a gear 13 carried by a shaft 14 through an idler gear 15. Each of the frames which consist of the parts 5 and 6 are capable of sufficient pivotal motion to cause the pinions 9 to mesh with either of the gears 11 or 15, or to be put out of mesh with both of them.

In order to shift the frames consisting of the parts 5 and 6, pneumatics 16 and 18 may be used, the former being at the top and the latter at the bottom of the frame 1. From the pneumatics 16 rods 17 extend to the upper parts 5 and from the pneumatic 18 rods 19 extend to the lower parts 5. One of the pneumatics 16 and 18 may be so arranged as to be only partially compressed when exhausted so that the gears 9 will be thrown out of mesh with the gears 15, but will not be sufficiently raised to mesh with the gears 11. The other two pneumatics 16 and 18 will be so arranged as to remove the pinions 9 from mesh with the gears 15 and throw them into mesh with the gears 11. Each of the belts 10 is acted upon by a flanged pulley 20 supported by a bracket 21 upon a collar 22 threaded upon a feed screw 23. The upper pulley 20 contacts with the upper side of its belt and the lower pulley with the lower side of its belt. The two brackets 21 are connected by rods 24 between the extremities of which is positioned a coiled spring 25. The tension in this spring tends to hold the pulleys 20 securely in contact with their respective belts. The pressure of the pulleys 20 upon their respective belts imparts to the pivotal frames, each consisting of the parts 5 and 6, a tendency to move toward each other. The pinions 9 are thus made to normally engage the gears 15 when the pneumatics 16 and 18 are exhausted. Each of the feed screws 23 carries a star wheel 26 fast thereupon and adapted to be actuated by a pin 27 carried by the adjacent gear 11.

In the operation of this mechanism, power will be applied to the two shafts 2. This power will be communicated through the belts 10 to the pulleys 8 from which it will be transmitted to either of the shafts 12 or 14. As the gears 11 revolve the pin 27 will periodically encounter the star wheel 26 so that the feed screws 23 will undergo periodic rotation. This will cause the collars 22 to be fed slowly across the feed screw producing a corresponding lateral displacement in the pulleys 20 and the belts 10. The rapidity of this lateral displacement may be regulated in several ways. This rapidity will depend upon the pitch of the feed screw, the inclination of the cone pulleys, the size of the star wheel and various other features.

While two sets of this mechanism are shown and described in this specification as working in combination it is obvious that one set employing only one set of cone pulleys might be employed if desired.

The novelty is believed to lie primarily in the gradual feeding of a belt across a pair of cone pulleys, but the entire apparatus shown here is also claimed as an exemplification of this simple mechanism.

What I claim is:

1. In a device of the character described, the combination with a driving shaft, of a cone pulley thereupon, a frame pivoted upon the driving shaft, a cone pulley mounted in said frame oppositely disposed to the first named pulley, a belt mounted upon said pulleys, a mechanism adapted to gradually feed said belt across the pulleys, a pair of shafts parallel with the last named pulley, sets of gearing adapted to communicate rotation to either of the shafts from the last named pulley, a gear adapted to communicate rotation from the last named pulley to either set of gearing according to the pivotal position of the aforesaid frame, and a pneumatic adapted to vary the pivotal position of the frame.

2. In a device of the character described, the combination with two pairs of oppositely disposed cone pulleys, of a belt mounted upon said pulleys, a feed screw adjacent to each pair of pulleys and parallel to their axes, a collar threaded upon the feed screw, flanged pulleys engaging the upper side of the upper belt and the lower side of the lower one, brackets supporting said pulleys from said collars, means establishing a resilient connection between the two brackets, and means communicating rotation to the feed screws from one of their respective pairs of pulleys.

3. In a device of the character described, the combination with a pair of oppositely disposed cone pulleys, of a belt mounted upon said pulleys, a mechanism for gradually feeding said belt across the pulleys, a pair of shafts parallel to the axes of the pulleys, means by which communication of rotation may be established between one of the pulleys and one of the shafts, a mechanism adapted to transfer the communication of rotation from the last named pulley to the other of said shafts, and a pneumatic adapted to prevent communication of rotation from the pulleys to either of said shafts.

4. In a device of the character described, the combination with a driving shaft of a frame pivoted upon said shaft, a pair of oppositely disposed cone pulleys mounted in said frame, a belt mounted upon said pulleys, a mechanism adapted to gradually feed the belt across the pulleys, and a pneumatic adapted to vary the pivotal position of said frame.

5. In a device of the character described, the combination with a driving shaft, of a frame pivoted thereupon, a pair of oppositely disposed cone pulleys in said frame, a belt mounted upon said pulleys, a feed screw parallel to the axes of said pulleys, a collar mounted upon said feed screw, a flanged pulley supported from said collar and engaging the belt, means by which a periodic rotation is imparted to the feed screw from one of the pulleys, and a pneumatic adapted to vary the pivotal position of the frame.

In testimony whereof I have signed my name to this specification in the presence of two subscribing witnesses.

FLOYD F. STAUFFER.

Witnesses:
J. S. MURRAY,
B. F. THERREL.

---

Copies of this patent may be obtained for five cents each, by addressing the "Commissioner of Patents, Washington, D. C."